US010694773B1

(12) United States Patent
Christie et al.

(10) Patent No.: US 10,694,773 B1
(45) Date of Patent: Jun. 30, 2020

(54) COOKING EXTRUSION HORN

(71) Applicant: Tyson Foods, Inc., Springdale, AR (US)

(72) Inventors: Mark Christie, Fayetteville, AR (US); Anthony J. Cardarelli, Rogers, AR (US); James A. Ruff, Springdale, AR (US); Dejing Fu, Lisle, IL (US)

(73) Assignee: TYSON FOODS, INC., Springdale, AR (US)

( * ) Notice: Subject to any disclaimer, the term of this patent is extended or adjusted under 35 U.S.C. 154(b) by 0 days.

(21) Appl. No.: 16/532,038

(22) Filed: Aug. 5, 2019

Related U.S. Application Data

(62) Division of application No. 15/042,689, filed on Feb. 12, 2016, now Pat. No. 10,368,572.

(51) Int. Cl.
*A23P 30/20* (2016.01)
*A22C 7/00* (2006.01)
*B29C 48/30* (2019.01)
*A22C 11/02* (2006.01)
*B29C 48/00* (2019.01)

(52) U.S. Cl.
CPC .......... *A23P 30/20* (2016.08); *A22C 7/00* (2013.01); *A22C 11/0209* (2013.01); *B29C 48/30* (2019.02); *B29C 48/022* (2019.02)

(58) Field of Classification Search
CPC ....... A22C 11/00; A22C 11/001; A22C 11/02; A22C 11/0209; A23P 30/20; A23P 30/00; A23P 30/30; A23P 30/34

USPC .......... 452/21–26, 30–32, 35–37, 46–48, 51
See application file for complete search history.

(56) References Cited

U.S. PATENT DOCUMENTS

| | | | | | |
|---|---|---|---|---|---|
| 5,024,041 | A | * | 6/1991 | Urban | A22C 11/0263 53/449 |
| 5,156,565 | A | * | 10/1992 | Jonnard | A22C 13/00 138/118.1 |
| 6,056,634 | A | * | 5/2000 | Schwarz | B01F 5/0646 366/337 |
| 7,195,551 | B2 | * | 3/2007 | Shefet | A22C 11/001 426/513 |
| 7,377,841 | B2 | * | 5/2008 | Bartleucci | A63H 3/02 452/30 |
| 2016/0165907 | A1 | * | 6/2016 | Leenen | A22C 17/04 452/138 |

* cited by examiner

*Primary Examiner* — Richard T Price, Jr.
(74) *Attorney, Agent, or Firm* — Greensfelder, Hemker & Gale, P.C.; Mark E. Stallion

(57) ABSTRACT

An apparatus and method for extruding extrudate through an extruding horn having a geometry that allows for a uniform flow from the discharge end into a cooking section that sets the outer surfaces of continuous flow of all meat specie. The technology as disclosed and claimed allows for uniform product thickness throughout the cooking process, increased system throughput, and increased bind in the sheet leading to overall increased product yields. The technology eliminates the need for a meat press ahead of the system to set thickness further reducing yields.

5 Claims, 3 Drawing Sheets

COOKING EXTRUSION HORN

CROSS REFERENCE

This application is a divisional of U.S. patent application Ser. No. 15/042,689 entitled COOKING EXTRUSION HORN, filed on Feb. 12, 2016, which is incorporated herein by reference in its entirety.

BACKGROUND

Field

This technology relates generally to stuffing horns, more particularly, to stuffing horn configuration for cooking a product.

Background Art

A wide variety of products, such as food products, require processing before use by or sale to consumers. Generally, food products are processed in various stages, for example marinating, cutting, deboning, breading, adding spices, cooking, dicing, brazing, searing, freezing, and packaging, and combinations thereof. In particular, a known processing system provides for the transportation of meat food products, such as chicken breasts or tenders, or any animal or plant based protein item from a marinating tumbler to an oven. The product can also be a ground meat product or meat batter or other food extrudate that can be formed into a final product having a particular shape or form factor after being extruded through a horn device and subsequently placed in a bag that is vacuum sealed or other casing such as a collagen film or a coating material that may consist of a mixture or gel with a coagulatable protein. This type of system can be a continuous food processing system whereby an edible food strand of meat or the like is extruded to be processed into a product or a desired meat cut could be provided. The exterior of the product is subject to contamination prior packaging.

The meat food products can be deposited onto an oven belt or other conveyor belt as it is being processed, which can pass through an oven to cook the meat food products. In such a system, a plurality of conveyor belts can be used to transfer the meat food product from for example a marinating tumbler through a press belt and onto the oven belt. A plurality of operators can also be employed to ensure that the meat food products are evenly distributed on the conveyor in order to avoid pile up, reduce floor loss and on oven belts in order to cook the meat food products uniformly and thoroughly.

Such a method is generally known. These known methods are being used for the extrusion of sausage or sausage-like materials or other protein based products. In principal this method involves the extrusion through an extrusion horn a product such as that of a sausage mix. The food extrudate can be extruded when the extrudate is warm or cold. The stuffer horn can also act heating element as well as an extruder in a manner that is sufficient to at least partially cook the food extrudate. However, the problem with many stuffer horn devices is that the horn design is not configured to allow for uniform flow of food extrudate and the devices do not provide uniform size and cross section extrusion of the food extrudate throughout the entire cooking process.

Existing equipment and processes have other shortcomings. Among these shortcomings are extruders which are complex. Conveyors used for the strand are open and invite unwanted lateral movement of the strand during movement through the conveyer trough.

BRIEF SUMMARY

The technology as disclosed and claimed is an extrusion horn having a geometry that allows for a uniform flow from the discharge end into a cooking section that sets the outer surfaces of continuous flow of all meat specie. The technology as disclosed and claimed allows for uniform product thickness throughout the cooking process, increased system throughput, and increased bind in the sheet leading to overall increased product yields. The technology eliminates the need for a meat press ahead of the system to set thickness further reducing yields. The technology extrudes a uniform flow of whole muscle/whole muscle and ground proteins uniformly into a heated confined space that is designed to provide ample back pressure on the product preventing higher than atmospheric pressures resulting from ejecting the product stream prematurely. The device increases through put by uniformly setting the product thickness thereby allowing for higher cook yields due to a uniform product thickness in the final cook step. The technology can be implemented in a device having a small footprint. The device increases bind in the sheet thus reducing dicing/slicing losses. The cooking section of the extrusion horn can sear the food extrudate, such as ground meat, under pressure. The taper of the cooking section of the extrusion horn (tapered thick to thin) can apply back pressure to the food extrudate flow. The cooking section of the extrusion horn seers the product on all sides as it passes through thereby cooking the food extrudate on the fly.

One implementation of the technology as disclosed and claimed is an extrusion horn apparatus including a conduit communicably extending between an entry portal and an exit portal, where said conduit includes a feeder conduit portion communicably extending from the entry portal and communicably contacting a tapered portion. The feeder conduit portion can be in-line and positioned end-to-end to the tapered portion, which communicably extends to the exit portal. Food extrudate can flow in through the entry portal and through an internal channel of the feeder conduit, which is in fluid communication with the tapered portion such that the food extrudate can flow out of the feeder conduit and through the tapered portion. The tapered portion of the conduit can have an outwardly tapered end and an inwardly tapered end where the outwardly tapered end is disposed at an upstream position with respect to the inwardly tapered end communicably extending to the exit portal. The inwardly tapered end can have a sufficient inward angle to provide adequate back pressure on the food extrudate so that the horn extrudes a uniform flow. The walls of the tapered portion of the conduit can be configured to be heating elements sufficient to sear the food extrudate as it passes through the tapered portion of the conduit.

The technology as disclosed and claimed herein can be utilized for various protein based extrudate products, such as chicken breasts or tenders, or any animal or plant based protein items. The product can also be a ground meat product or meat batter or other food extrudate that can be formed into a final product having a particular shape or form factor after being extruded through the tapered horn device and subsequently placed in a bag that is vacuum sealed or other casing. These and other advantageous features of the present invention will be in part apparent and in part pointed out herein below.

BRIEF DESCRIPTION OF THE DRAWINGS

For a better understanding of the present invention, reference may be made to the accompanying drawings in which.

Figure 1A:
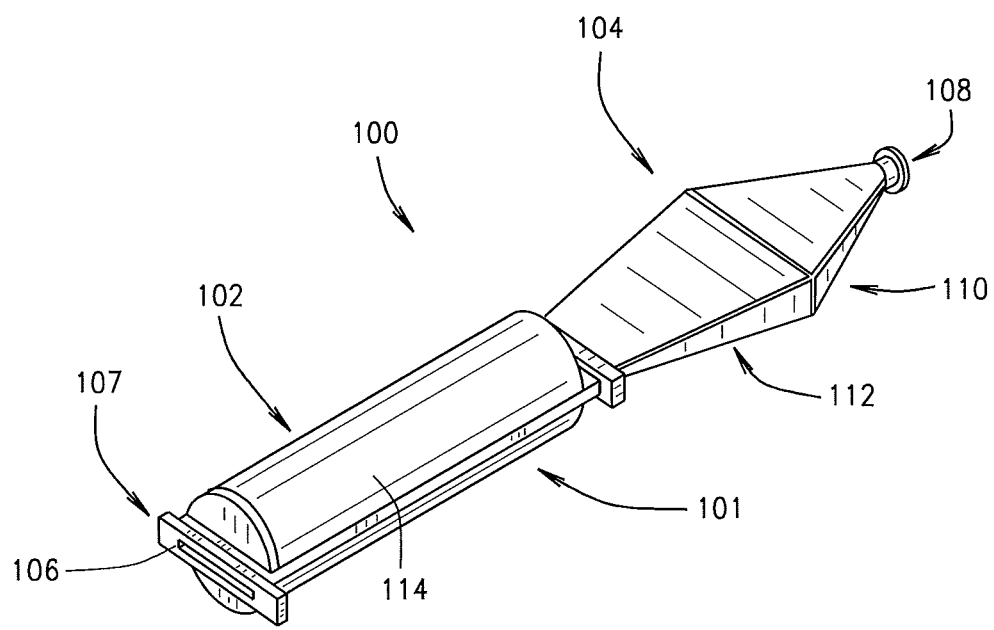
FIG. 1A is a perspective view of an extrusion horn illustrating the entry end.

While the invention is susceptible to various modifications and alternative forms, specific embodiments thereof are shown by way of example in the drawings and will herein be described in detail. It should be understood, however, that the drawings and detailed description presented herein are not intended to limit the invention to the particular embodiment disclosed, but on the contrary, the intention is to cover all modifications, equivalents, and alternatives falling within the spirit and scope of the present invention as defined by the appended claims.

DETAILED DESCRIPTION OF INVENTION

According to the embodiment(s) of the present invention, various views are illustrated in FIGS. 1-4 and like reference numerals are being used consistently throughout to refer to like and corresponding parts of the invention for all of the various views and figures of the drawing. Also, please note that the first digit(s) of the reference number for a given item or part of the invention should correspond to the Fig. number in which the item or part is first identified.

One implementation of the present technology as disclosed and claimed includes an extrusion horn apparatus, which teaches a novel apparatus and method for extruding a product through a tapered portion of a conduit, which provides sufficient back pressure to assure a uniform flow and which acts as a heating element to sear the product or extrudate as it passes through.

The details of the invention and various embodiments can be better understood by referring to the figures of the drawing. Referring to FIG. 1A, an extrusion horn apparatus 100 is illustrated. One implementation of the technology is a device including a conduit 101 communicably extending between an entry portal 106 and an exit portal 108. In one implementation, the conduit 101 can be communicable or in fluid communication between the entry portal 106 and exit portal 108 by using an internal lengthwise channel (not shown in FIG. 1) extending between and communicable with the entry portal and the exit portal. In one implementation of the technology, the conduit 100 can have a feeder conduit portion 102 communicably extending from the entry portal 106 and communicably contacting, in-line, and end-to-end a tapered portion 104 communicably extending to the exit portal. The tapered portion 104 of the conduit has an outwardly tapered end 112 and an inwardly tapered end 110 where the outwardly tapered end is disposed at an upstream position with respect to the inwardly tapered end communicably extending to the exit portal. The entry portal 106 is a slitted entry opening in an entry end 107 of the feeder conduit portion 102. The feeder conduit portion can be an elongated tubular structure 114. The exit portal 108 can be a slitted exit opening—See FIG. 4B.

Figure 1B:
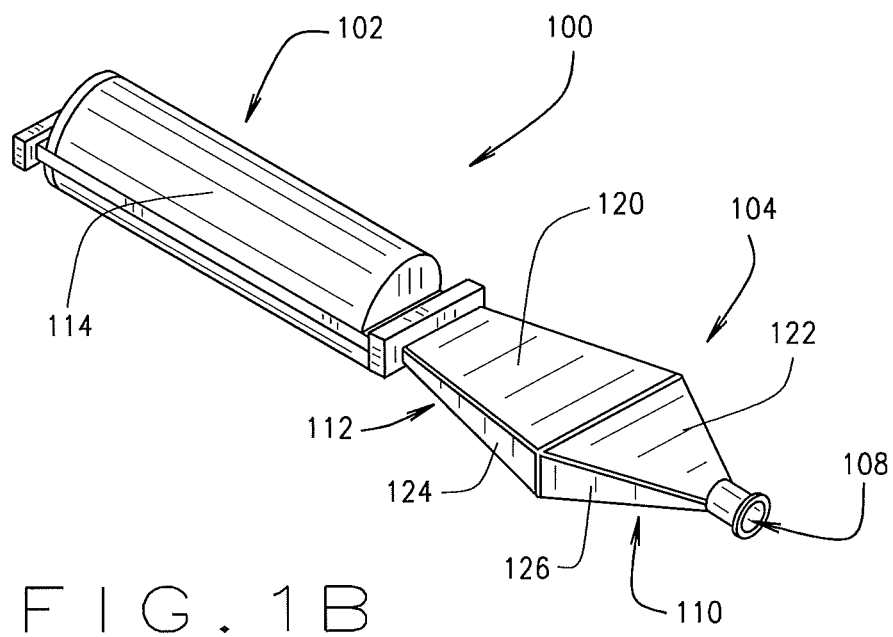
FIG. 1B is a perspective view of an extrusion horn illustrating the exit end.
Figure 2:
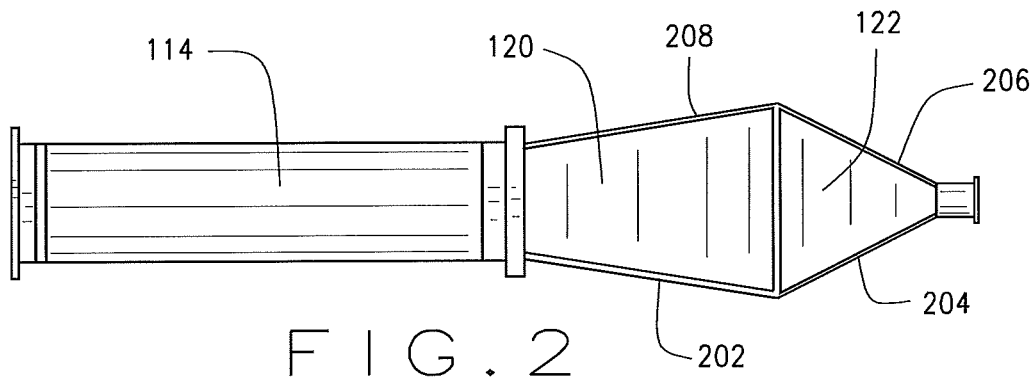
FIG. 2 is a top plan view of an extrusion horn.
Figure 3:
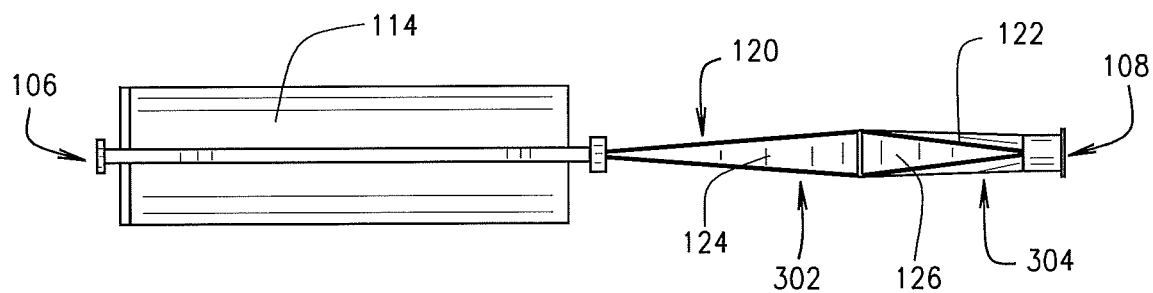
FIG. 3 is a side view of an extrusion horn.

Referring to FIG. 1B, the extrusion horn apparatus 100 having a tapered portion 104 can have an inwardly tapered end 110. The inwardly tapered end 110 of the tapered portion 104 of the conduit can include an upper inwardly tapered plate 122 and a lower inwardly tapered plate 304 (See FIG. 3) each extending downstream and tapered inwardly one with respect to the other where a distance between the upper inwardly tapered plate 122 and the lower inwardly tapered plate 304 decreases as the upper inwardly tapered plate and lower inwardly tapered plate extend downstream toward the exit portal 108. Also, referring to FIG. 2 a distance between outer edges, 204 and 206 of the upper inwardly tapered plate and the lower inwardly tapered plate can decrease as the upper inwardly tapered plate and the lower inwardly tapered plate extend downstream.

Referring again to FIG. 1B, the inwardly tapered end 110 of the tapered portion 104 of the conduit can include a left-side inwardly tapered plate 406 (See FIG. 4B) and a right-side inwardly tapered plate 126 each extending downstream and tapered inwardly one with respect to the other where a distance between the left-side inwardly tapered plate 126 and the right-side inwardly tapered plate 126 decreases as the left-side inwardly tapered plate and the right-side inwardly tapered plate extend downstream, and where a distance between outer edges 204 and 206 of the left-side inwardly tapered plate and the right-side inwardly tapered plate decreases as the left-side inwardly tapered plate and the right-side inwardly tapered plate extend downstream.

The extrusion horn apparatus 100 as disclosed and claimed, where the outwardly tapered end 112 of the tapered portion of the conduit includes an upper outwardly tapered plate 120 and a lower outwardly tapered plate 304 each extending downstream and tapered outwardly one with respect to the other where a distance between the upper outwardly tapered plate 120 and the lower outwardly tapered plate 304 increases as the upper outwardly tapered plate and lower outwardly tapered plate extend downstream, and where a distance between outer edges of the upper outwardly tapered plate and the lower outwardly tapered plate increases as the upper outwardly tapered plate and the lower outwardly tapered plate extend downstream. The outwardly tapered end 112 of the tapered portion of the conduit includes a left-side outwardly tapered plate 404 (See FIG. 4A) and a right-side outwardly tapered plate 124 each extending downstream and tapered outwardly one with respect to the other where a distance between the left-side outwardly tapered plate 404 and the right-side outwardly tapered plate 112 increases as the left-side outwardly tapered plate and the right-side outwardly tapered plate extend downstream, and where a distance between outer edges of the left-side outwardly tapered plate and the right-side outwardly tapered plate increases as the left-side outwardly tapered plate and the right-side outwardly tapered plate extend downstream.

The tapered portion 104 can also act as a cooking portion that sears the extrudate as it passes through. The tapered portion 104 can also be configured as a heating element that when powered can sear the extrudate as it passes through. The tapered geometry of horn makes the meat extrudate flow out uniformly without blowouts by providing back pressure. The extrudate can be pushed through to the tapered end acting as a heat transfer device having upper plate and lower plate and side plates thereby searing meat on top and bottom and all sides of the extrudate. The partially cook outside of the extrudate, for example a meat product, helps to maintain the product intact. Any marinate or seasoning applied to the product also gets cooked and seared to the product. Partial cooking on the fly is provided during extrusion.

Figure 4A:
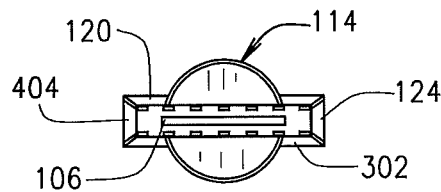
FIG. 4A is an entry end plan view of an extrusion horn illustrating the entry end.
Figure 4B:
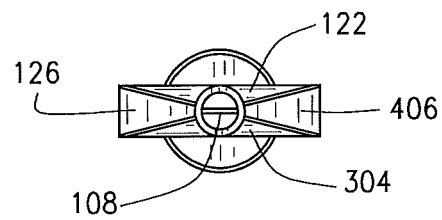
FIG. 4B is an exit end plan view of an extrusion horn illustrating the exit end.
Figure 4C:
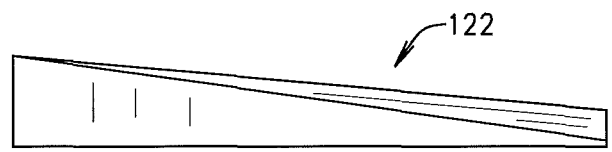
FIG. 4C is a side view of the upper inwardly tapered plate.
Figure 4D:
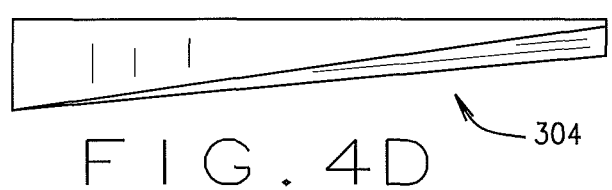
FIG. 4D is a side view of the lower inwardly tapered plate.
Figures 4E, 4F, 4G:
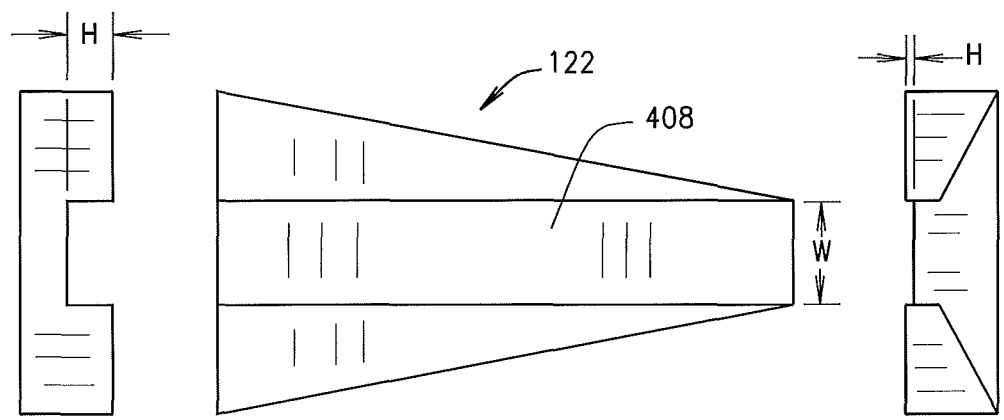
FIG. 4E is an entry end view of the upper inwardly tapered plate.
FIG. 4F is bottom view of the upper inwardly tapered plate illustrating the internal channel.
FIG. 4G is an exit end view of the upper inwardly tapered plate.

Referring to FIGS. 4C and 4D, the upper inwardly tapered plate 122 and the lower inwardly tapered plate 304 are illustrated. The upper and lower inwardly tapered plates 122 and 304 define an internal lengthwise channel through which extrudate flows. FIG. 4F illustrates a bottom view of the upper inwardly tapered plate, which reveals the upper portion 408 of the internal lengthwise channel. A complimentary lower portion of the internal lengthwise channel is comparably defined by the lower inwardly tapered plate 304. FIGS. 4E and 4G are illustrative of the taper of the internal lengthwise channel, as the upper portion of the entry end into the channel, as seen in FIG. 4E, has a greater height than the height of the upper portion of the exit end as seen in FIG. 4G.

The portion of the internal lengthwise channel extending through the inwardly tapered end progressively decreases in height ("H") such that this portion of the internal lengthwise channel is inwardly tapered thereby causing back pressure to provide for uniform flow of the extrudate. For example, the internal lengthwise channel can decrease in height in the range of about approximately 0.125 inches from the entry end to the exit end. However, the slope of the taper can be adjusted depending on the pressure and the consistency of the extrudate. For example, the decrease in height from entry end to the exit end can be a decrease in height in a range from approximately 0.125 inches and 0.2 inches. Again, this can vary depending on the desired back pressure and the consistency of the extrudate. In one implementation of the technology as disclosed the width ("W") of the internal lengthwise channel can be uniform. The width ("W") of the channel can be designed based on the consistency and other characteristics of the extrudate. For example for some extrudate, the width of the channel can be in the range of 1-20 inches or possibly wider for other types of extrudates. The height ("H") of the channel can be in the range of about approximately 0.125-2 inches.

Figure 4H:
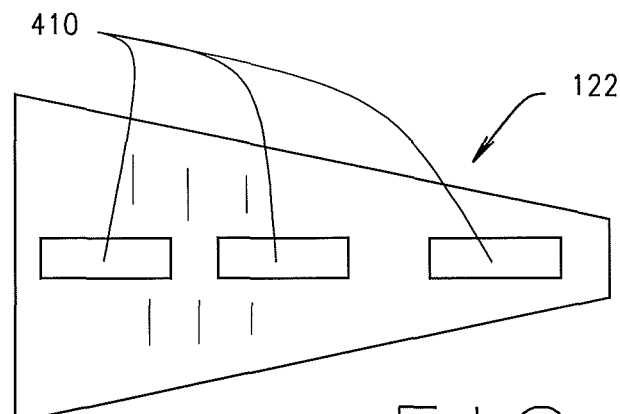
FIG. 4H is a sectional view of the upper inwardly tapered plate illustrating zones of the heat exchange jacket.

Referring to FIG. 4H, a sectional view of the upper inwardly tapered plate, illustrates the zones 410 of the heat exchange jacket, which provide the energy for searing the extrudate. One implementation of the heat exchange jacket can utilized pressurized steam injected into the zones thereby transferring heat to the inner wall of the internal lengthwise channel that is sufficient to sear the extrudate. The heat exchange can also be powered by heated fluids and the like. The inner wall of the internal lengthwise channel that contacts the extrudate and sears the extrudate when energized (See FIG. 4F, which illustrates the upper portion 408 of the internal lengthwise channel and reveals the inner wall) can have a non-stick surface finish and/or a non-stick coating applied to the inner wall. For example, polytetrafluoroethylene (PTFE), often sold under the brand name "TEFLON"®, can be applied or a ceramic coating, silicone coating or an enameled cast iron coating. Also, a highly polished stainless steel, anodized aluminum or a seasoned cast iron surface can be utilized. Also, non-stick fabrics that are replaceable can be utilized over the inner wall cooking surface such as for example, PTFE coated fabrics can be utilized. A non-stick fabric can be periodically replaced as a wear item.

The various implementations provided herein illustrate and extrusion horn, which provides sufficient back pressure on the extrudate and sears the extrudate as it passes through. A user of the present technology may choose any of the above extrusion horn implementations, or an equivalent thereof, depending upon the desired application. In this regard, it is recognized that various forms of the subject extrusion horn could be utilized without departing from the scope of the present invention. The technology as disclosed and claimed herein can be utilized for various protein based extrudate products, such as chicken breasts or tenders, or any animal or plant based protein items. The product can also be a ground meat product or meat batter or other food extrudate that can be formed into a final product having a particular shape or form factor after being extruded through the tapered horn device and subsequently placed in a bag that is vacuum sealed or other casing.

As is evident from the foregoing description, certain aspects of the present implementation are not limited by the particular details of the examples illustrated herein, and it is therefore contemplated that other modifications and applications, or equivalents thereof, will occur to those skilled in the art. It is accordingly intended that the claims shall cover all such modifications and applications that do not depart from the spirit and scope of the present implementation. Accordingly, the specification and drawings are to be regarded in an illustrative rather than a restrictive sense.

Certain systems, apparatus, applications or processes are described herein and these systems, apparatus and application can include a number of modules. A module may be a unit of distinct functionality that may be presented in software, hardware, or combinations thereof. When the functionality of a module is performed in any part through software, the module includes a computer-readable medium. The modules may be regarded as being communicatively coupled. The inventive subject matter may be represented in a variety of different implementations of which there are many possible permutations. For example, the flow of extrudate and the rate of flow can be programmed and controlled by a computing device. The turning on and off of the heater element function of the tapered end and the heating element temperature can be controlled by a computing device.

The methods described herein do not have to be executed in the order described, or in any particular order. Moreover, various activities described with respect to the methods identified herein can be executed in serial or parallel fashion. In the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter may lie in less than all features of a single disclosed embodiment. Thus, the following claims are hereby incorporated into the Detailed Description, with each claim standing on its own as a separate embodiment.

In an example embodiment, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a server computer, a client computer, a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine or computing device. Further, while only a single machine is illustrated, the term "machine" shall also be taken to include any collection of machines that individually or jointly execute a set (or multiple sets) of instructions to perform any one or more of the methodologies discussed herein. In the case of the present technology, the extrusion horn can be a machine that is operated on an automated network. The flow of the extrudate can be controlled on the network, the partial cooking and other functionality.

If a computer system is utilized to control the extrusion horn operation, the computer system can include a processor (e.g., a central processing unit (CPU) a graphics processing unit (GPU) or both), a main memory and a static memory, which communicate with each other via a bus. The computer system may further include a video/graphical display unit (e.g., a liquid crystal display (LCD) or a cathode ray tube (CRT)). The computer system and any client computing devices can also include an alphanumeric input device (e.g., a keyboard), a cursor control device (e.g., a mouse), a drive unit, a signal generation device (e.g., a speaker) and a network interface device.

Other aspects, objects and advantages of the present invention can be obtained from a study of the drawings, the disclosure and the appended claims.

What is claimed is:

1. A method of extruding extrudate through an extrusion horn comprising:
    extruding an extrudate through a conduit communicably extending between an entry portal and an exit portal, by extruding the extrudate through a feeder conduit portion of the conduit communicably extending from the entry portal and communicably contacting with an in-line end-to-end relationship to a tapered portion communicably extending to the exit portal, and further extruding the extrudate through the tapered portion,
    where the tapered portion of the conduit has an outwardly tapered end and an inwardly tapered end where the outwardly tapered end is disposed at an upstream position with respect to the inwardly tapered end thereby providing back pressure against the extrudate to improve uniform flow, and where the tapered portion is configured as a heating element, and thereby searing the extrudate as the extrudate flows through the tapered portion.

2. The method for extruding extrudate as recited in claim 1, where the inwardly tapered end of the conduit has one of a non-stick coating and a non-stick surface applied for searing the product flowing there through.

3. The method for extruding extrudate as recited in claim 2, where the non-stick coating is one or more of a polytetrafluoroethylene (PTFE) coating, a ceramic coating, a silicone coating and an enameled cast iron coating.

4. The method for extruding extrudate as recited in claim 2, where the non-stick surface is one or more of a highly polished stainless steel surface, an anodized aluminum surface and a seasoned cast iron surface.

5. The method for extruding extrudate as recited in claim 1, comprising:
    applying a non-stick coated fabric over an inner wall of the inwardly tapered end of the conduit.

* * * * *